Aug. 9, 1966  H. R. DIAMOND  3,265,418
JOINT CONSTRUCTIONS
Filed Nov. 6, 1963
2 Sheets-Sheet 1
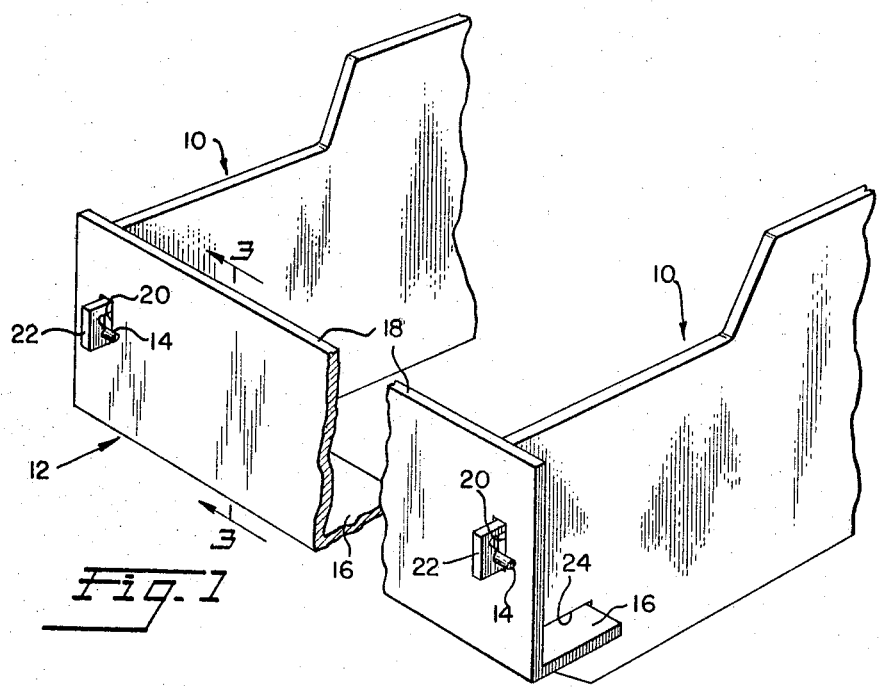
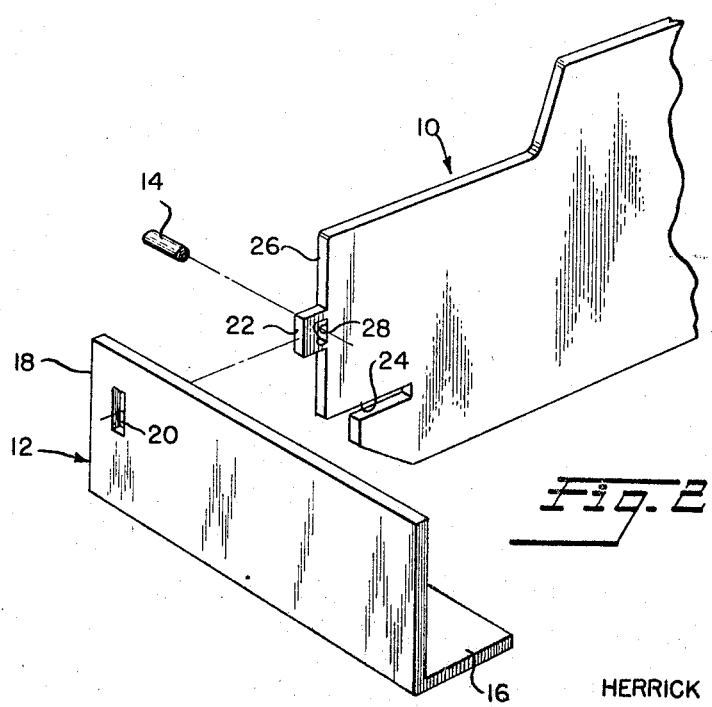
INVENTOR.
HERRICK R. DIAMOND
BY
Strauch, Nolan & Neale
ATTORNEYS

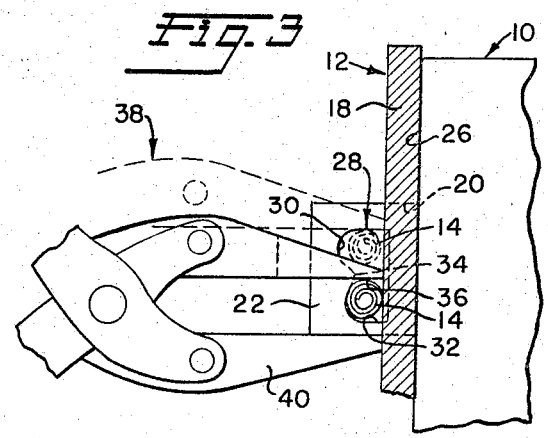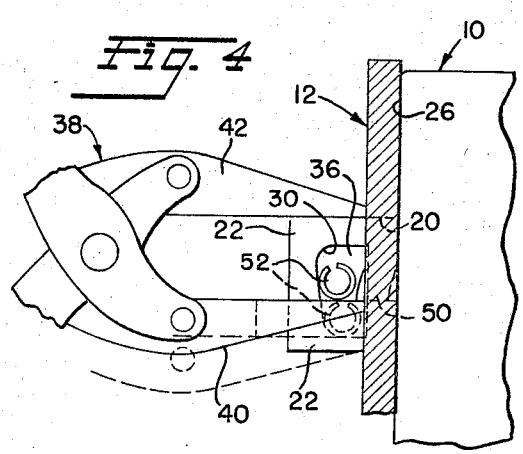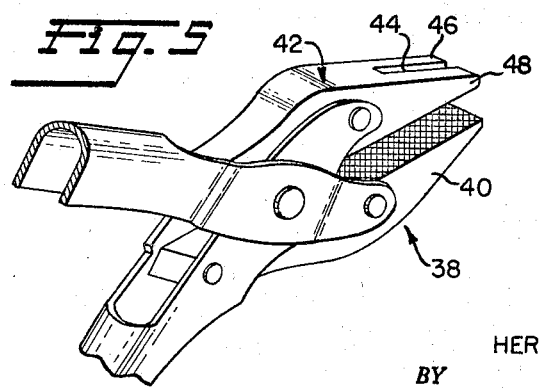

United States Patent Office 3,265,418
Patented August 9, 1966

3,265,418
JOINT CONSTRUCTIONS
Herrick R. Diamond, Homer, N.Y., assignor to SCM Corporation, New York, N.Y., a corporation of New York
Filed Nov. 6, 1963, Ser. No. 321,931
3 Claims. (Cl. 287—189.36)

This invention relates to improved joint constructions for connecting structural members. The principles of the present invention are useful, for example, in assembling typewriter and similar frames, though they are by no means limited in usefulness to this one application. Therefore, although the principles of the present invention will be developed by relating them to the foregoing application, it is to be understood that this application is merely exemplary and does not, by itself, constitute the present invention.

In assembling the component members of typewriter and similar frames, provisions must often be made for disassembly, or certain standards of flexibility, rigidity, etc. must be met, or the components to be assembled are heat sensitive, and the choice of fasteners may therefore be quite restricted. Such members are conventionally assembled with rivets or screws or by welding with rivets or screws being most widely employed. Both rivets and screws, however, take undue time to install and are relatively expensive, resulting in undesirably high manufacturing costs.

In an attempt to overcome the disadvantages of these conventional fasteners, the relatively inexpensive and theoretically easily installed "Spirol" pins disclosed in United States Patent No. 2,737,843 to H. Koehl for Resilient Coiled Sheet Metal Fastening Pin and other similar, commercially available fasteners were developed. "Spirol" fasteners are hollow coils of resilient sheet metal which will contract when driven lengthwise into a hole that has an interference fit with the pin. As discussed in the Koehl patent, "Spirol" pins have heretofore been utilized to join members having aligned cylindrical bores by driving the pin into the bores. The pin's resiliency therefore tends to expand it to its unstressed diameter, resulting in a frictional force that retains the pin in place.

In actual practice, it has been found that this prior art construction requires the thickness of the components to be assembled and the dimensions, alignment, and location of the bores be held to extremely close tolerances. If they are not, a build-up of tolerances often occurs, making insertion of the pin impossible since the latter has only a limited degree of flexibility.

As the tolerances required in the above-described joint construction are economically impractical for assembly line techniques of manufacturing, manufacturers have reverted to the more expensive and time consuming methods of assembly in which screws and rivets are employed.

One object of the present invention resides in the provision of improved joint constructions for retaining structural components in an assembled relationship.

Another object of the present invention resides in the provision of improved methods of assembling structural members.

It is another object of the present invention to provide novel joint constructions which utilize fasteners that are less expensive and more readily installed than those conventionally employed and which obviate the problems making prior joint constructions employing radially compressible fasteners economically impractical.

The foregoing objects are achieved by a novel joint construction of the tongue and slot type in which two members to be joined are provided, respectively, with a slot and with an integral tongue which may be inserted through the slot in the first member. In the present invention, an aperture is formed in the tongue having first and second portions which are, respectively, larger and smaller than the cross sectional area of the compressible type fastener and are separated by a fastener retaining projection. The compressible fastener is inserted lengthwise into the first aperture portion and then forced over the retaining projection into the second, smaller diameter portion in which it is retained by the above projection. Since, in the second aperture portion, the fastener is compressed below its normal dimensions, its resiliency tends to restore the fastener to its normal, uncompressed dimensions, providing a force tending to move the two members into juxtaposition and hold them in firm engagement.

From the foregoing, it will be apparent that another important object of the present invention resides in the provision of improved joint constructions of the slot and tongue type.

Additional objects and further novel features of the present invention will become more fully apparent from the appended claims and as the ensuing detailed description and discussion proceeds in conjunction with the accompanying drawing, in which:

FIGURE 1 is a perspective view of a typewriter side and front frame assembly embodying the present invention;

FIGURE 2 is an exploded perspective view of a typewriter frame joint construction embodying the present invention;

FIGURE 3 is a section through the assembly of FIGURE 1, taken substantially along line 3—3 of the latter figure;

FIGURE 4 is a view similar to FIGURE 3, but illustrating a modified form of fastener retaining projection; and FIGURE 5 is a partial perspective view of an assembly tool employed in practicing the novel assembly methods of the present invention.

Referring now to the drawing, FIGURE 1 illustrates the application of the principles of the present invention to the assembly of typewriter frames. More specifically, this figure shows a joint construction, in accordance with the principles of the present invention, for assembling a typewriter's side frames 10 and front frame 12 with radially compressible fasteners 14. The two side frames 10 and their connections to front frame 12 are substantially identical. Therefore, only the left-hand connection will be described it being understood that the right-hand end connection is substantially the same.

The illustrated, exemplary front frame 12 has a horizontally extending leg 16 and vertically extending leg 18 in which a vertical, rectangularly sectioned slot 20 is formed.

Typewriter side frame 10 is provided with an integral tongue 22 of slightly smaller cross sectional dimensions than slot 20. As shown in phantom lines in FIGURE 2, tongue 22 extends through slot 20 when side frame 10 is assembled to front frame 12.

A horizontally extending slot 24 is formed adjacent the lower edge of typewriter side frame 10 so that, when the typewriter frame components are assembled, side frame 10 may be moved toward front frame 12 until the edge 26 of the side frame on which tongue 22 is formed is juxtaposed to the vertical leg 18 of front frame 12.

A fastener receiving aperture 28 is formed in the tongue 22 of typewriter side frame 10. Aperture 28 has an upper portion 30 which, as shown in FIGURE 3, has an area larger than the cross sectional area of fastener 14, permitting the fastener to be readily inserted lengthwise into this aperture portion after side frame 10 has been assembled to front frame 12. Aperture 28 also has a lower aperture portion 32, the width of which is substantially less than the normal, uncompressed diameter of fastener 14 so that, when fastener 14 is moved into aperture portion 32 (as shown in full lines in FIGURE 1), it is compressed between the edge of aperture portion 32 and the vertical leg 18 of typewriter frame 12. Aperture portions 30 and 32 are separated by a fastener retaining projection 34 which is provided to retain fastener 14 in the lower aperture portion 32.

Fastener 14 may be any of a number of well-known and commercially available, radially compressible fasteners. As illustrated, it is of the well-known "Spirol" type which is formed by winding a rectangular sheet of spring metal of substantially uniform thickness into a hollow and generally cylindrical configuration of not less than about two turns. Preferably, the sheet terminates in a radially extending edge as shown at 36 in FIGURE 3 since this results in a fastener of increased strength. Since the remaining details of "Spirol" fasteners are not critical in the practice of the present invention and as they are fully disclosed in the Koehl patent referred to above, it is not deemed necessary to repeat them therein.

The foregoing components are assembled with the assembly tool 38 shown in FIGURE 5. Referring now to this figure, assembly tool 38 comprises a pair of parallel action type pliers (the illustrated pliers are the well-known "Bernard" type) provided with an abutment forming lower jaw 40 and an upper jaw 42 in which a slot 44 slightly wider than the thickness of side frame tongue 22 is formed.

Referring now to FIGURE 3, side and front frames 10 and 12 are joined (after assembling them in the manner discussed above) by inserting radially compressible fastener 14 lengthwise through the upper portion 30 of the aperture 28 in tongue 22. Assembly tool 38 is then positioned with its lower jaw 40 against the lower edge of tongue 22 and the two bifurcations 46 and 48 of upper jaw 42 on opposite sides of the tongue 22 and above fastener 14. The handles (not shown) of assembly tool 38 are then squeezed, moving jaw 42 downwardly in a rectilinear path toward jaw 40. As jaw 42 moves downwardly, it engages fastener 14, causing the fastener to roll along the front edge of aperture portion 30 until it engages the outer surface of front frame vertical leg 18. Further squeezing of the tool handles effects further downward movement of jaw 42 and fastener 14. As fastener 14 moves between the narrow opening between retaining projection 34 and front frame vertical leg 18, it "coils up," reducing its diameter, and moves over retaining projection 34 into lower aperture portion 32, at which point assembly tool 38 may be removed.

As was pointed out above, aperture portion 32 is narrower than the uncompressed diameter of fastener 14 so that, in aperture portion 32, fastener 14 is retained in its "coiled up" configuration. The resilience of the spring material from which fastener 14 is formed therefore tends to restore fastener 14 to its original diameter, thereby exerting oppositely directed forces on side frame tongue 22 and the vertical leg 18 of front frame 20. These forces draw side frame front edge 26 against front frame vertical leg 18, holding the frame members in firm engagement.

Retaining projection 34 prevents fastener 14 from moving laterally (or upwardly) out of lower aperture portion 32. The friction between fastener 14 and the edge of aperture portion 32 and front frame vertical leg 18 prevents the fastener from slipping lengthwise out of the lower aperture portion even though the typewriter frame is severely bumped or jarred.

If desired, typewriter frame members 10 and 12 may be readily disassembled. This is accomplished by inverting assembly tool 38 and placing its abutment forming jaw 40 against the upper edge of tongue 22 with the bifurcations 46 and 48 of its lower jaw 42 beneath fastener 14. The assembly tool handles are then squeezed, moving jaw 42 and fastener 14 upward until fastener 14 passes over retaining projection 34 into the enlarged upper aperture portion 30 from which it may be readily moved in a lengthwise direction.

FIGURE 4 shows an alternate method for forming the fastener retaining projection and an alternate form of fastener. In this embodiment, the fastener retaining projection 50 is formed by lancing it from the typewriter front frame vertical leg 18. The fastener 52 is a generally cylindrical sleeve of sheet metal which may be assembled in the same manner as the "Spirol" fasteners described above. This embodiment is otherwise substantially identical to the embodiment shown in FIGURES 1–3 and described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An improved frame construction, comprising, in combination:
    (a) a slotted member and a second member having a tongue extending from an edge thereof, said second member being disposed at right angles to said slotted member with said edge in juxtaposition with one side of said slotted member and said tongue extending through the slot;
    (b) an aperture through said tongue;
    (c) an elongated, resilient, radially compressible fastener extending through said aperture and abutting said slotted member on the side thereof opposite the edge of said second member;
    (d) the exposed width of one portion of said aperture being smaller than the normal uncompressed diameter of said fastener, whereby the assembled fastener is maintained compressed and thereby exerts a reactive force tending to move said edge into engagement with said slotted member;
    (e) said aperture having a second portion of greater dimensions than the normal, uncompressed diameter of said fastener communicating with said one portion, whereby said fastener may be readily inserted lengthwise in said second portion and thereafter, by compressing it, forced laterally into said one portion; and
    (f) said tongue having a retaining projection extending between said aperture portions to retain said fastener in said one portion.

2. The construction as defined in claim 1, wherein said fastener is a rectangular sheet of spring metal of substantially uniform thickness wound into a hollow and generally cylindrical configuration of not less than about two turns.

3. The construction as defined in claim 2, wherein said sheet terminates in substantially radially extending edges.

References Cited by the Examiner
UNITED STATES PATENTS
1,118,979  12/1914  Weiss _____ 189—36 X
2,737,843  3/1956  Koehl _____ 85—11 X FOREIGN PATENTS
206,921  2/1909  Germany.

HARRISON R. MOSELEY, *Primary Examiner.*

A. I. BREIER, *Assistant Examiner.*